United States Patent

[11] 3,620,703

| [72] | Inventors | James W. Evans<br>Corning;<br>Robert G. Foster, Elmira, both of N.Y. |
|---|---|---|
| [21] | Appl. No. | 596,942 |
| [22] | Filed | Nov. 25, 1966 |
| [45] | Patented | Nov. 16, 1971 |
| [73] | Assignee | Corning Glass Works<br>Corning, N.Y. |

[54] METHOD OF FABRICATING GLASS ORIFICE PLATES
10 Claims, 7 Drawing Figs.

[52] U.S. Cl. .................................................. 65/42,
   18/8 G, 18/8 SS, 65/23, 65/43, 65/54, 65/55, 65/61,
   156/182, 264/152
[51] Int. Cl. ............................................. C03b 23/20,
   C03c 27/06
[50] Field of Search .......................................... 65/23, 42,
   43, 54, 55, 61, 374; 18/8 G, 8 SC, 8 SR, 8 SS;
   156/182; 264/152

[56] References Cited
UNITED STATES PATENTS
3,156,950  11/1964  Walton  ............  18/8 SS Primary Examiner—S. Leon Bashore
Assistant Examiner—Edward R. Freedman
Attorneys—Clarence R. Patty, Jr and Charles W. Gregg ABSTRACT: A method of forming blanks or workpieces into members each having a minute hole or orifice and especially an orifice having an unusual or uncommon shape extending therethrough. The orifice in each formed member of a group of such members is geometrically congruent to that of each of the other members of such group and the members of the group may, for example, be used in the fabrication of one or more orifice plates which may be employed as spinneret or filter plates.

PATENTED NOV 16 1971 3,620,703
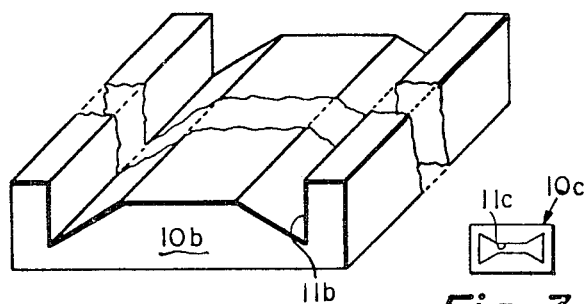
Fig. 1
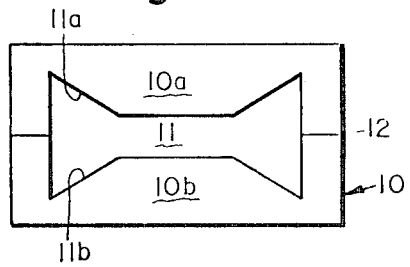
Fig. 2
Fig. 3
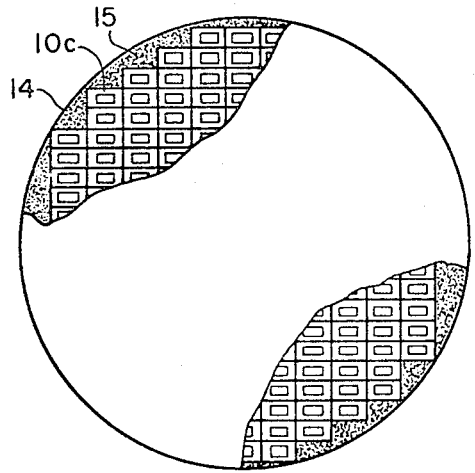
Fig. 4
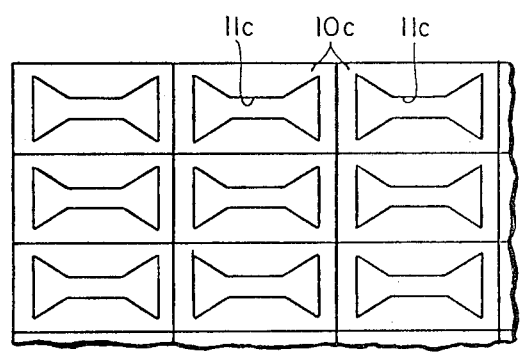
Fig. 5
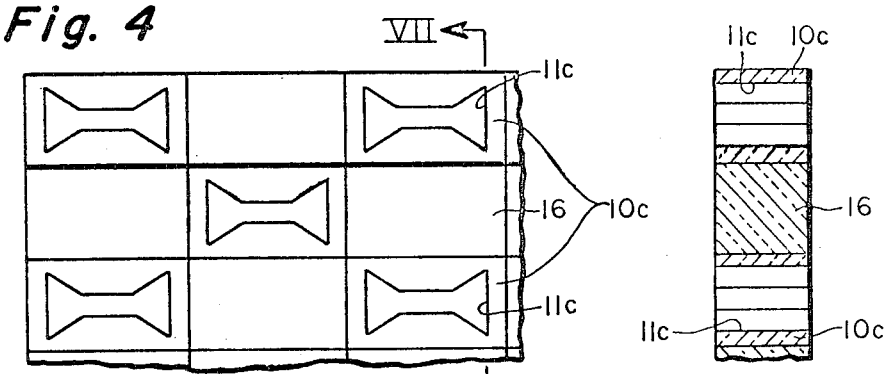
Fig. 6  Fig. 7
INVENTORS.
JAMES W. EVANS
ROBERT G. FOSTER
BY
Charles W. Gregg
AGENT

METHOD OF FABRICATING GLASS ORIFICE PLATES

The present invention relates to orifice plates and particularly to a method of forming members for the fabrication of orifice plates. Still more specifically the present invention relates to a method of forming workpieces or blanks of a ductile material into members each having an unusually or uncommonly shaped minute orifice extending therethrough, each such member and its orifice being identical or geometrically congruent to each of the other of such members, and such members being intended for use in the fabrication of one or more orifice plates to be employed, for example, as spinneret plates for the spinning of synthetic filaments or as filter plates in filtering devices, etc.

There is shown, for example, in U.S. Pat. No. 2,945,739 issued July 19, 1960 to David J. Lehmicke for Process of Melt Spinning, a number of outlines of uncommon or unusual designs or configurations of orifices provided in spinnerets for spinning of synthetic filaments or fibers. As set forth in said patent the production of synthetic filaments by spinnerets having an orifice or orifices of uncommon or unusual configurations oftentimes has certain advantages over the production of synthetic filaments by spinnerets embodying an orifice or orifices having a round configuration. However, prior to the present invention, it has been relatively difficult and expensive to make spinnerets which embody precisely shaped, or uncommonly or unusually shaped orifices, especially when the orifices are of an extremely minute cross-sectional area such as are usually desired in spinnerets.

It is, accordingly, an object of the present invention to provide a novel and relatively inexpensive method of forming members to be used in the fabrication of orifices plates having at least one unusually or uncommonly shaped orifice extending therethrough.

It is another object of the present invention to provide a method of forming members to be used in the fabrication of orifice plates having extending therethrough a plurality of orifices of minute cross-sectional areal expanse.

It is a third object of the present invention to provide a method of forming members especially adaptable for the fabrication of orifice plates for spinnerets having at least one orifice of an odd-shaped configuration and extremely minute cross-sectional area, such method being simpler and more economical than methods heretofore employed for the same purpose.

In accomplishing the above objects of the invention, one or more blanks or workpieces of a suitably ductile material, preferably a glass or glass-ceramic material, are provided, at least a portion of each said blank along one axis thereof being of uniform cross-sectional areal expanse. Each such blank is divided along said axis into a number of pieces such that the pieces can be readily engraved by incising or grinding along such axis and rejoined to form a perforated blank having an orifice extending therethrough in the direction of said axis, such orifice being an enlarged facsimile of the orifice or orifices desired in an orifice plate or plates fabricated from one or more of such perforated blanks. Each perforated blank is then heated and drawn in the direction of said axis to uniformly reduce the cross-sectional areal expanse of at least said uniform portion of the respective blank while proportionally uniformly reducing the cross-sectional areal expanse of said orifice provided therein. Thereafter, the ends of each drawn blank are cut off normal to said axis to provide one or more identical members each having an orifice extending therethrough parallel with said axis, such members being adaptable for the formation of an orifice plate as previously mentioned and as hereinafter described.

Other objects and characteristic features of the invention will become apparent as the description proceeds.

Although the invention is discussed herein as especially suitable for the forming of members for the fabrication of orifice plates for spinnerets, it is to be understood that such discussion is by way of an example only and it is not intended that the invention be confined to the forming of orifice members for spinnerets.

The invention will best be understood with reference to the accompanying drawings wherein:

FIG. 1 is an isometric view of a half of a workpiece or blank which has been divided and engraved in accordance with one stage of the invention, and which is of indeterminate length and, therefore, illustrated with the center portion thereof cut away;

FIG. 2 comprises an end view of two identical halves of a workpiece or blank engraved as illustrated in FIG. 1 and rejoined in accordance with another stage of the invention;

FIG. 3 comprises an end view similar to FIG. 2 but illustrating the rejoined workpiece or blank following a further step of the invention;

FIG. 4 is a face view of an orifice plate embodying the present invention;

FIG. 5 is a view on an enlarged scale of a portion of the face view of FIG. 4;

FIG. 6 is a view on an enlarged scale of a portion of a modification of the face view of FIG. 4; and FIG. 7 comprises a cross-sectional view of a modified orifice plate as in FIG. 6 and taken substantially along line VII—VII of FIG. 6.

Similar reference characters refer to similar parts in each of the FIGS. of the drawings.

In general, in practicing the present invention, there is provided one or more blanks or workpieces of a tractile or ductile material, each such workpiece preferably being a longitudinally uniform workpiece such that any cross section thereof taken normal to the longitudinal axis of the workpiece along at least a substantial portion of the length thereof will be geometrically congruent to any other such cross section, that is, will be identical in cross-sectional areal expanse and configuration to any other such cross section of the workpiece. Each ductile blank or workpiece is preferably of a glass or glass- ceramic material and the overall dimensions and cross-sectional configuration of each workpiece are selected in accordance with the size and shape of the orifice plate members to be formed therefrom and the completed orifice plate or plates to be fabricated from such members. That is to say, as will become apparent hereinafter, at least said portion of the length of each blank or workpiece provided must have a cross-sectional areal expanse and configuration such that an enlarged facsimile or replica of the cross section of the orifice to be provided in each orifice plate member can be provided in said portion of the blank with such orifice facsimile extending therethrough along said longitudinal axis and with a substantial volume of the material of such blank portion surrounding the enlarged orifice facsimile.

It has been chosen to describe and illustrate the invention in conjunction with orifice plate members formed of a glass or glass-ceramic material and each of which are provided with an orifice having a cross-sectional shape of a longitudinal slot with triangularly flared or enlarged ends, such as is illustrated in FIG. 2 of the drawings. Therefore, with reference to the drawings in detail, such an example of the practice of the invention will be given.

One or more solid and preferably elongated or longitudinal parent blanks or workpieces having rectangular cross-sectional configurations normal to the longitudinal axis thereof, as illustrated by the perimetric boundary or outer boundary of blank 10 illustrated in FIG. 2 of the drawings, are provided. Since, as previously mentioned, it is intended that an orifice having a cross-sectional configuration such as that shown for orifice 11 in blank 10 (FIG. 2) is to be provided in each of the formed members from which one or more orifice plates are to be fabricated, said parent blanks or workpieces are each equally divided along their respective longitudinal axis, into two equal parts or halves 10a and 10b (FIGS. 1 and 2). Each such half of each parent blank is then, as illustrated in conjunction with half 10b in FIG. 1 of the drawings, similarly precisely engraved along the longitudinal axis thereof, as by precisely incising or grounding of each respective half, to form therein a channel such as 11a or 11b (FIG. 1) cross-sectionally corresponding to half of orifice 11 illustrated in FIG. 2. Halves 10a and 10b of a parent blank are then precisely rejoined along their division line 12 (FIG. 2) and held in such rejoined position by any suitable material, such as wax for example. It is pointed out at this time that the cross-sectional dimensions of each parent workpiece or blank, such as 10, are substantially greater than those of the orifice plate members to be formed from one or more of such blanks or workpieces, and that the cross-sectional dimensions of the orifice, such as 11, provided in each such blank by the rejoining of the two halves 10a and 10b of the respective blank are substantially greater than those of the orifice to be provided in each said orifice plate member. However, the cross-sectional configuration of orifice 11 is an enlarged facsimile or replica of the orifice to be provided in each such plate member.

Following the rejoining of halves 10a and 10b of each parent blank or workpiece, each respective parent blank is heated to a ductile state and drawn to further elongate such blank and simultaneously reduce the cross-sectional dimensions thereof while simultaneously fusion sealing the two joined halves of the blank to again from an integrant blank of such halves. Such drawing is continued until the orifice such as 11 in each blank corresponds in size to the size of the orifice desired in each of said orifice plate members. The wax or other material used to hold the rejoined halves of each parent blank together prior to the drawing thereof is dissipated during the heating and drawing cycle. FIG. 3 illustrates the end of a drawn and fusion sealed blank 10c having an orifice 11c therein cross-sectionally corresponding in shape to orifice 11 in blank 10 but substantially smaller in cross-sectional areal expanse.

The techniques employed for drawing a blank, such as 10, down to the desired size for the orifice in a formed member such as 10c to be used for the fabrication of orifice plates are well known in the glass-making art. However, it has been found that the temperature of a glass or glass-ceramic blank, such as 10, at the time of the drawing thereof should preferably be near its softening temperature which, of course, depends on the composition of the glass or glass-ceramic. By having the blank heated through to such a temperature a minimum amount of distortion of an orifice, such as 11, in such blank will occur during the drawing of the blank. However, such distortion is usually well within tolerable limits even when the blank is not at its ideal drawing temperature. The distortion of the orifice in the blank is also dependent, of course, on the amount of the reduction in the cross-sectional area of the blank during drawing thereof, that is, dependent on the length to which the blank is drawn.

As previously mentioned, each parent blank or workpiece is preferably an elongated or longitudinal workpiece and each may, for example, be a workpiece about 4 feet in length. However, this will depend on the number of orifice plate members desired, the cross-sectional areal expanse of the orifices to be provided in the finished orifice plate or plates and the spacing thereof, and the perimetric dimensions of each parent workpiece provided, this latter parameter depending substantially on said areal expanse and spacing. In any event, each parent blank or workpiece must be securely held or clamped at each end of the longitudinal axis of the respective workpiece for the drawing thereof and, therefore, substantially elongated or longitudinal workpieces provide sufficient stock for secure clamping adjacent the ends of the respective workpiece with ample stock remaining between the points of clamping for the drawing thereof, that is, ample stock for uniform reduction in cross-sectional area of a substantial portion of each workpiece during drawing thereof.

Subsequent to the drawing of a blank or blanks such as 10c (FIG. 3) of reduced cross-sectional dimensions, the blank or blanks may be evenly divided normal to the longitudinal axis thereof to form a plurality of identical members, each member of such plurality being cross-sectionally geometrically congruent to each of the other members of such plurality. Assuming that the members so formed are divided into a plurality of relatively thin members, such members may be disposed edge to edge in a plane with a cementitious material between the edges thereof and then surrounded by an annular band or tube such as 14 as illustrated in FIG. 4 of the drawings. Additional cementitious material 15 (FIG. 4) can be used to fill in the spaces between the outermost members and the bank or tube. The cementitious material is then allowed to dry or is cured to seal said members together and to said annular band or tube, and an orifice plate is thereby provided. Many resin, epoxy and other types of materials are known which may be used for the cementitious material.

FIG. 5, as previously mentioned, comprises an enlargement of a portion of the face view of FIG. 4 and illustrates one edge to edge orifice plate member arrangement which may be used in the fabrication of an orifice plate as discussed above. Alternatively, spacer members such as 16 (FIG. 6) may be provided between the edges of the perforated orifice plate members 10c if so desired. FIG. 7 illustrates a cross section of a portion of an orifice plate fabricated by the arrangement illustrated in the enlarged view of FIG. 6.

If it is desired to fabricate a large quantity of similar orifice plates, a plurality of orifice plate members, such as 10c and of identical lengths, may be drawn and the longitudinally aligned parallel with each other with the ends thereof arranged in a manner similar to that illustrated in FIGS. 5 or 6. Such orifice plate members are secured to each other in said alignment by a cementitious material such as that previously mentioned and which is provided between the members during said alignment thereof. A bundle of elongated members is thereby provided. Such bundle is then divided preferably normal to the longitudinal axis of the bundle to provide said quantity of orifice plates.

The preferred method of forming the orifice plate members herein described, is to draw one or more parent workpieces or blanks, such as 10, until the orifice or orifices such as 11, therein are reduced in cross-sectional areal expanse to that desired for the orifices to be provided in the orifice plate or plates fabricated from such members. However, when the orifices which it is desired to provide in such an orifice plate are extremely minute, it is sometimes necessary and oftentimes expedient to draw a plurality of identical parent blanks or workpieces down to a size convenient for handling, to then bundle the drawn blanks in a longitudinally parallel relationship with each other, heat the bundle to a ductile temperature and redraw the heated bundle to further reduce the cross-sectional areal expanse of the orifices in the bundled and previously drawn blanks while simultaneously fusion sealing such blanks to each other. Alternatively, a single parent blank or workpiece can be drawn, cut into substantially equal length blanks and then bundled and redrawn as described. Such bundling and redrawing can be repeated several times but when the orifices are of an unusual shape, not without somewhat increased distortion of the shape of the orifices during each redraw cycle. If considerable latitude in the final shape of the orifices can be tolerated the redraw cycle can be repeated numerous times. In other words, the number of redraw cycles that can be performed is limited by the amount of distortion permissible in the shape of the final orifices from that of the original orifice or orifices provided in the parent blank or blanks. Such bundling of drawn blanks and redrawing thereof is well known in the art.

In the light of the foregoing discussion, it is readily apparent that as well as precisely shaped orifices, orifices having uncommon or unusual shapes other that that illustrated and described can be provided in orifice plate members by employing the method of the present invention. For example, referring to the aforementioned Lehmicke patent, the orifice outline illustrated in FIG. IV of such patent is similar to that described herein. Orifice outlines similar to those illustrated in FIGS. I, II, III, V, and VII through X of the Lehmicke patent can also be provided by the method above described. In providing orifices with outlines or cross-sectional configurations such as illustrated in FIGS. XI and XII of the cited patent, it would be expedient to divide the parent blanks into three and four pieces, respectively, for facility of engraving thereof, and then rejoin such pieces for the drawing of the rejoined blank. It is also readily apparent that many other orifices of uncommon or unusual shapes and too numerous to be described can be provided, by the method of the present invention, in members used for the fabrication of orifice plates.

We claim:

1. The method of forming members form which can be fabricated an orifice plate having a plurality of minute orifices corresponding in size and shape to each other and extending through the plate from one of the larger areal surfaces of the plate to the other thereof, such method comprising; providing at least one ductile workpiece each having a uniform cross section normal to the longitudinal selected axis of the respective workpiece, any cross section taken normal to such axis having an areal expanse substantially greater than one of said orifices; longitudinally dividing each said workpiece parallel with its said axis into a number of pieces such that the pieces can be readily engraved and rejoined to form a perforated workpiece having an enlarged facsimile of one of said orifices extending through the workpiece parallel with its said axis, and longitudinally precisely engraving and then rejoining said pieces of each workpiece to provide a perforated workpiece; and heating and longitudinally drawing each said perforated workpiece in a direction parallel with its said axis to fusion seal said pieces to each other and to elongate each such workpiece while simultaneously uniformly reducing the areal expanse of said cross section thereof and the areal expanse of said facsimile of said orifice provided therein, thereby providing one or more of said members.

2. The method in accordance with claim 1 in which each said workpiece is formed of a material selected from the group comprising glass and glass-ceramic materials, and the engraving of each such workpiece is performed by grinding.

3. The method of fabricating an orifice plate from a glass or glass-ceramic material and having a plurality of uncommonly shaped orifices corresponding in size and shape to each other and extending through the plate in a direction normal to the larger areal surfaces of the plate, such method comprising; providing a blank of one of said materials, such blank having a uniformly longitudinal configuration such that any cross section of the blank taken at right angles to the longitudinal axis of the blank is geometrically congruent to any other such cross section and each such cross section has an areal expanse such that a greatly enlarged orifice corresponding in shape to each of said uncommonly shaped orifices can be provided in said blank extending longitudinally through the blank parallel with said axis and with a substantial part of said areal expanse surrounding said enlarged orifice; longitudinally dividing said blank into a number of pieces such that the pieces can be readily engraved and then rejoined to provide said enlarged orifice extending longitudinally through the blank parallel with said axis, and precisely engraving and then rejoining such pieces in such a manner; heating and longitudinally drawing said blank to further elongate such blank and reduce the cross-sectional areal expanse of the blank and said enlarged orifice while fusion sealing the rejoined pieces of the blank to each other, cross-sectionally dividing the drawn blank at right angles to the longitudinal axis thereof to provide a plurality of identical portions of such drawn blank, disposing such cross-sectional portions of said blank in a planar relationship with each other in accordance with the pattern of the orifices desired in said orifice plate, and securing said portions to each other in said planar relationship to form an integral plate thereof provided with a plurality of identical orifices.

4. The method in accordance with claim 3 in which the engraving of said blank is performed by grinding, and further including reheating and longitudinally redrawing said integral plate to reduce the planar expanse thereof and simultaneously further reduce down to a desired expanse the cross-sectional areal expanse of each of the orifices therein.

5. The method of fabricating plates of a ductile material each having a pattern of minute, identical and unusually shaped orifices extending therethrough parallel with each other; such method comprising, providing a plurality of longitudinal workpieces each having a uniform cross section greater in areal expanse than one of said orifices; dividing each said workpiece, in the direction of the longitudinal axis normal to the cross section thereof, into a number of pieces that can be readily engraved parallel with said axis and rejoined to provide therein an enlarged replica of one of said orifices extending through each respective workpiece in the direction of such axis, and precisely so longitudinally engraving and rejoining said pieces; heating and longitudinally drawing each rejoined workpiece to uniformly reduce the areal expanse of said cross section and of said orifice replica while fusion sealing said pieces of each respective workpiece to each other, longitudinally disposing said drawn workpieces with said axes thereof in a parallel relationship with each other and in accordance with said pattern of orifices for said plates, joining said workpieces with each other in said relationship, and cutting the joined workpieces in a direction normal to said longitudinal axes to provide said plates.

6. The method in accordance with claim 5 and in which said workpieces are joined in said relationship with each other by a cementitious material.

7. The method in accordance with claim 5 and in which said ductile material is glass and the engraving of said workpieces is performed by grinding.

8. The method in accordance with claim 5 and including further steps of reheating and longitudinally redrawing said formed plates to uniformly reduce the size of the plates and simultaneously uniformly further reduce the size of the orifices therein.

9. The method of forming a longitudinal member having a relatively minute orifice of a selected uniform cross-sectional configuration extending longitudinally therethrough, such method comprising, providing a plurality of similar ductile workpieces having uniform cross sections normal to the longitudinal axis of each such workpiece, engraving longitudinally parallel with said axes at least one surface of each of selected ones of said workpieces so that such selected workpieces may be adjoined with the engraved surfaces thereof abutting to provide a composite workpiece having an axis extending parallel with said axes and an enlarged facsimile of said orifice extending longitudinally therethrough parallel with such axis, adjoining said engraved workpieces in such manner to provide said composite workpiece, and heating and longitudinally drawing said composite workpiece in a direction parallel with its said axis to fusion seal said engraved workpieces to each other and to elongate such composite workpiece while simultaneously uniformly reducing the cross-sectional areal expanse of the composite workpiece and of said facsimile of said orifice extending therethrough, whereby said member is provided.

10. The method in accordance with claim 9 and in which said ductile workpieces are of a material selected from the group comprising glass and glass-ceramic materials.

* * * * *